United States Patent [19]

Wagner et al.

[11] 4,299,467
[45] Nov. 10, 1981

[54] FOCUSSING SYSTEM FOR STILL AND MOTION-PICTURE CAMERAS

[75] Inventors: Karl Wagner, Munich; Eduard Wagensonner, Aschheim, both of Fed. Rep. of Germany

[73] Assignee: Agfa-Gevaert Aktiengesellschaft, Leverkusen, Fed. Rep. of Germany

[21] Appl. No.: 2,389

[22] Filed: Jan. 10, 1979

[30] Foreign Application Priority Data

Jan. 12, 1978 [DE] Fed. Rep. of Germany ....... 2801251

[51] Int. Cl.³ ............................................. G03B 13/18
[52] U.S. Cl. .................................................. 354/195
[58] Field of Search ............... 354/25, 195, 198, 23 D, 354/25 A; 352/140; 356/5

[56] References Cited

U.S. PATENT DOCUMENTS

| | | | |
|---|---|---|---|
| 4,103,309 | 7/1978 | Massa | 354/195 |
| 4,199,244 | 4/1980 | Shenk | 354/195 |

FOREIGN PATENT DOCUMENTS

| | | | |
|---|---|---|---|
| 864048 | 3/1952 | Fed. Rep. of Germany | 354/195 |
| 2744093 | 4/1978 | Fed. Rep. of Germany | 354/195 |

Primary Examiner—L. T. Hix
Assistant Examiner—William B. Perkey
Attorney, Agent, or Firm—Michael J. Striker

[57] ABSTRACT

A single transducer is used to emit acoustic radiation towards the subject and receive the reflected-back radiation to generate a received-back signal. Upon emission, a switch becomes conductive to initiate charging of a timing capacitor, the charging terminating in response to the received-back signal. The capacitor charges through a variable resistor coupled to the focus adjuster, at a slower rate for longer subject-distance setting and at a faster rate for shorter subject-distance settings. Because the duration of capacitor charging is longer for longer actual subject distance, the voltage achieved by the capacitor at the termination of capacitor charging always has approximately the same value, no matter what the subject-distance setting, if the subject-distance setting is in fact correct, and thus this voltage constitutes a quality-of-focus signal. The latter signal is applied to one input of a subtractor whose other input receives a desired-quality-of-focus signal. The subtractor output signal is applied to two threshold stages, with neither threshold level exceeded when the setting is too long, both threshold levels exceeded when the setting is too short, and only one threshold level exceeded when the setting is acceptable. Two flip-flops are connected to respective threshold-stage outputs and are clocked by the received-back signal and respectively control two LED's, to indicate the sense of the focus error.

3 Claims, 2 Drawing Figures

FOCUSSING SYSTEM FOR STILL AND MOTION-PICTURE CAMERAS

BACKGROUND OF THE INVENTION

The present invention concerns focussing systems of the type in which camera-to-subject distance is measured by the emission of ultrasonic acoustic radiation towards the subject with generation of a received-back signal when the radiation reflected back from the subject is received back at the camera, with the time of generation of the received-back signal being utilized to terminate operation of a timer which initiates upon radiation emission, the signal furnished by the timer upon termination of the timing operation accordingly being dependent upon the acoustically measured subject-distance.

Such systems are known. It is furthermore known to use the measured-subject-distance signal to control an indicator which informs the user of the direction in which he should manually move the camera's focus adjuster to correct the state of focus of the camera.

SUMMARY OF THE INVENTION

It is the general object of the present invention to provide a focussing system of the type identified above, of extremely compact, cheap and simple design and construction, and very reliable operation.

A variety of interrelated features are employed in accordance with the present invention, all contributing to this aim.

In the preferred embodiment of the invention, the rate at which the timing operation is performed is modified in dependence upon the present distance-setting of the camera.

Most preferably, this is done in such a manner that the rate of performance of the timing operation increases with shorter distance-settings and decreases with longer distance-settings, the duration of the timing operation of course increasing as the actual subject distance becomes longer and longer. These counteracting influences upon performance of the timing operation can yield a timer signal whose value is always substantially the same, for any distance-setting, provided the distance-setting actually corresponds to the true subject-distance. Accordingly, the timer signal can itself constitute a quality-of-focus signal, and be applied to one input of a subtractor or comparator, whose other input receives a desired-quality-of-focus signal.

Alternatively, however, the quality-of-focus signal can be generated by allowing the timer to operate independently of the camera objective's distance-setting with the distance-setting instead being employed to generate an objective-setting signal from which the timer signal is subtracted algebraically to yield the quality-of-focus signal.

Preferably, initiation and termination of the timing operation is implemented using an electronic switch connected in the control circuit of the timer.

A signal-processing circuit receives the quality-of-focus signal, howsoever generated, and produced first and second digital output signals, respectively indicating that the camera's distance-setting is too short or too long.

A clocked digital storage circuit, preferably comprised of two clocked flip-flops each associated with a respective one of the digital output signals, is clocked once per acoustic measuring operation, preferably in response to the received-back signal itself. The output signals of the clocked digital storage circuit then serve to hold the most current focus information pending the outcome of the next acoustic measurement, these measurements preferably succeeding one another at a considerable repetition frequency. In per se conventional manner, the next burst, packet or pulse of acoustic radiation is not emitted until after the elapse of a time interval longer than would correspond to the greatest subject-distance with which the system is expected to deal.

The use of a clocked digital storage circuit such as just referred to is particularly advantageous for keeping the operation of all other system components reliable and interference-free, and for minimizing the number and complexity of components needed for purely secondary or supportive circuit-operation purposes. Thus, for example, once the digital output signals referred to above have been registered by the clocked digital storage circuit, the various other circuit components in the system can be returned to their original states in whatever way is simplest and most direct. If, for example, the timer is of the capacitor-charge type, the means utilized to discharge the capacitor in preparation for the next timing operation becomes quite uncritical, and a relatively slow discharge through a simple discharge resistor connected in parallel to the timing capacitor is quite sufficient and untroublesome. Similar comments apply to the changes of state, and to the initiations and terminations of operation, of other circuit components utilized in such a system, when such clocked digital storage means are employed.

In accordance with the invention, the transmitting circuitry for the electroacoustical transducer comprises an ultrasonic-frequency oscillator, a pulse generator, and an AND-gate, or the equivalent, receiving the output signals from both. This results in a particularly simple way of generating a periodic train of bursts or packets of pulses or oscillations.

In the preferred embodiment of the invention, the same electroacoustical transducer is used for both transmission and reception, thereby avoiding the need for a second such transducer. However, to then in a simple way decouple the transmitting and receiver circuitry associated with such transducer, use is made of a pair of anti-parallel-connected diodes connected in the current path of the transducer, with a junction between the anti-parallel diodes and the transducer being connected to the input of a gate device whose gating input is connected to the output of the pulse generator referred in the preceding paragraph. The gating device preferably comprises a simple field-effect transistor.

In that event, according to a particularly preferred aspect of this anti-parallel diode pair, the diodes are selected to have forward-bias threshold levels which are low enough to transmit signals from the transmitting circuitry to the electroacoustical transducer, but high enough to prevent the signal generated by the transducer upon receive-back of the emitted radiation from being applied to the transmitting circuitry. Instead, the receive-back signal is transmitted through the aforementioned gating device to the control electrode of a switch in the control current path of the timer. The forward-bias threshold levels should take into account the largest possible value of the received-back radiation signal, i.e., for the shortest subject-distance with which the system is to deal. With this use of the anti-parallel diodes, the receive-back signal produced by the transducer is transmitted rather directly to the electronic control switch for the timer, and is not attenuated by circuit components between which the transducer and the diode pair is located.

Preferably, the electronic switch connected in the current path of the timer is a switching transistor, most preferably a field-effect transistor, and its control electrode is connected to the output of a storage device, the latter assuming a preferred state in response to a pulse from the aforementioned pulse generator or from the ultrasonic-frequency signal source, to cause the switching transistor to assume its conductive (or non-conductive) state, to initiate the timing operation. Then the received-back signal causes the storage device to assume its other state, and the switching transistor therefore to assume its other conduction state, thereby terminating the timing operation. This makes it possible to develop, in a fairly simple way, a subject-distance-dependent voltage.

A particularly effective timing circuit envisioned by the present invention makes use of a timing capacitor connected in series with a variable resistor and in parallel with a fixed resistor. During charging, the two resistors serve as a voltage divider, determining the voltage to which the capacitor attempts to charge, and also the rate at which the capacitor charges. Intermediate timing operations, the fixed resistor serves as a simple discharge resistor, discharging the timing capacitor in preparation for the next timing operation. The variable resistor is coupled to the camera objective, e.g., to its focus adjuster ring. This makes it possible to modify the charging of the timing capacitor, whose duration depends upon subject distance, to be furthermore dependent upon the present subject-distance setting of the camera, so that both data, i.e., true and presently set subject-distance, can be combined into a single quality-of-focus signal, and in a particularly simple way.

In that event, the switching transistor is simply connected in series with the timing capacitor and the variable (objective-coupled) resistor. The resultant quality-of-focus signal can then be applied to one input of a comparator, whose other input receives a desired-state-of-focus signal, e.g., from the tap of a fixed-resistor voltage divider, and with the subtractor being of the operational-amplifier type. The output voltage of the operational amplifier is then applied to a digital signal-processing circuit comprised of two threshold stages, whose threshold levels are so related that neither threshold level or both threshold levels are exceeded when the state of focus is incorrect in a first or the opposite sense, respectively, but with only one threshold level exceeded when the error in the quality-of-focus signal falls within a factor-adjusted tolerance range. To convert this mode of level discrimination into window-discriminator action, one of the two threshold circuits is provided with an inverter in its output circuit.

Because the output flip-flops are relied on to simplify much of the configuration and operation of the circuitry feeding into them, it is preferred that these clocked flip-flops be RS-master-slave flip-flops, each one having a respective input inverter. The input of the inverter receives the signal from the respective one of the two threshold circuits and the input of the inverter is connected to one flip-flop input whereas the output of the inverter is connected to the other input of the flip-flop, so that the two inputs of each master-slave flip-flop can only receive the signal combinations "01" "10", to further minimize ambiguity and increase overall reliability.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
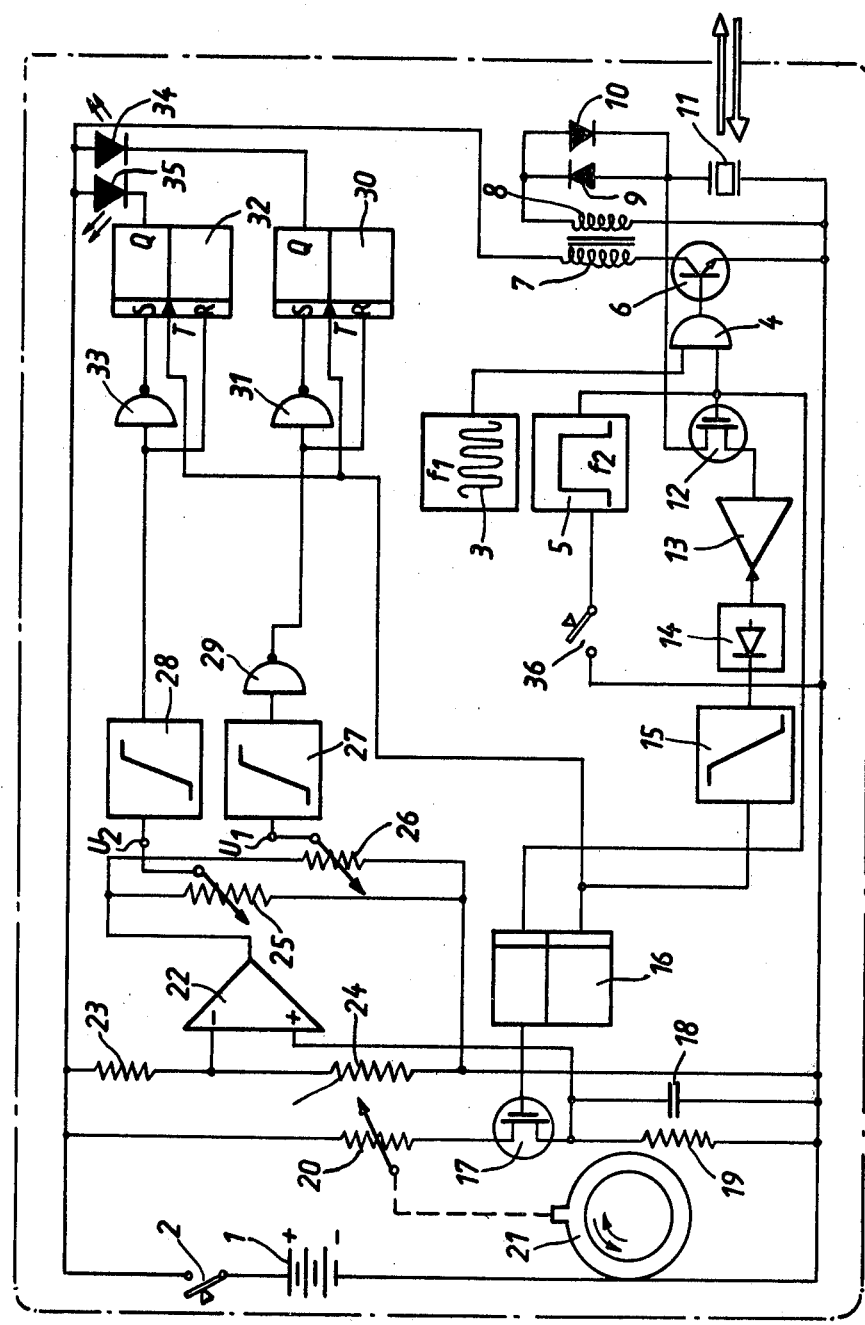
FIG. 1 depicts the presently preferred, but nevertheless an only exemplary embodiment of the present invention.

In FIG. 1, numeral 1 denotes a battery which is connectable by means of a power-connect switch 2 to the illustrated circuitry. A stage 3 generating a signal of ultrasonic frequency furnishes this signal to the upper input of an AND-gate 4, whose lower input is connected to the output of a pulse generator 5. The duration of each pulse produced by pulse generator 5 determines the duration of the burst or packet of pulses appearing at the output of AND-gate 4, and the frequency of the pulse train produced by pulse generator 5 determines the frequency with which an ultrasonic subject-distance measurement is automatically performed. The output of AND-gate 4 is connected to the base of a transistor 6, whose collector circuit contains the primary winding 7 of a coupling transformer having a secondary winding 8. Winding 8 is connected, via a pair of diodes 9, 10 connected anti-parallel to each other, to an electroacoustic transducer 11. In this embodiment transducer 11 is employed for both transmission and reception, but it will be understood that a separate second transducer could be employed for reception.

The junction of the anti-parallel diodes 9, 10 and the electroacoustic transducer 11 is connected to one of the two main electrodes of a field-effect transistor 12, whose main current path feeds into the input of an amplifier 13, to the output of which is connected a rectifier stage 14 and, in turn, a pulse shaping stage 15. The output of pulse shaping stage 15 is connected to the lower input of a storage stage 16, e.g., a two-stage flip-flop. The upper input of storage stage 16 is connected to the output of pulse generator 5.

The output of pulse generator 5 is furthermore connected to the control electrode of field-effect transistor 12. FET 12 is rendered forward-biased by the trailing end of each pulse produced by pulse generator 5.

The output of storage stage 16 is connected to the control electrode of an FET switching transistor 17. The trailing end of a pulse produced by pulse generator 5, through the intermediary of storage stage 16, renders switching transistor 17 conductive.

The main current path of FET 17 is connected in series with the parallel combination of a timing capacitor 18 and a fixed resistor 19, and is furthermore connected in series with a variable resistor 20 whose wiper is mechanically coupled to the focus adjuster ring 21 of the still or motion-picture camera, so that the resistance of resistor 20 vary as the setting of adjuster ring 21 is changed.

The upper terminal of timing capacitor 18 is connected to the non-inverting input of an operational amplifier 22, the inverting input of which is connected to the junction between two voltage-divider resistors 23, 24 which are of equal resistance value and which are connected across the battery 1.

The resistors of two parallel-connected potentiometers 25, 26 have their upper terminals connected to the output of operational amplifier 23 and their lower terminals connected to the negative terminal of battery 1. The wiper of potentiometer 26 is connected to the input of a threshold circuit 27 (e.g., a Schmitt-trigger stage), and the wiper of potentiometer 25 is connected to the input of another such threshold circuit 28. The voltage applied to the input terminal of threshold stage 27 is denoted U1, and that applied to the input terminal of threshold stage 28 is denoted U2. The settings of potentiometers 25, 26 and the threshold levels of threshold stages 27, 28 will be discussed below, in connection with circuit operation.

The output of threshold stage 27 is connected, via an inverter 29, to the R input of an RS-master-slave flip-flop 30, and to the S input thereof via a further inverter 31.

The output of threshold stage 28 is connected to the R input of an RS-master-slave flip-flop 32 and, via a further inverter 33, also to the S input thereof.

Alternatively, inverter 29 could be omitted, if inverter 31 were connected to the R-input of flip-flop 30.

Power-connect switch 2 is closed, and by non-illustrated means ultrasonic-frequency generator 3 is switched on, and then switch 36 is closed by the user, or automatically, thereby switching on pulse generator 5.

Beginning with the leading end of the pulse then produced by pulse generator 5, AND-gate 4 is enabled and transmits the oscillations produced by ultrasonic-frequency generator 3 to transistor 6, and via coupling transformer 7, 8 and anti-parallel-connected diodes 9, 10 to the electroacoustic transducer 11. The latter converts the received signal into a packet of oscillations which are emitted from the camera in the direction towards the subject to be photographed. The forward-bias threshold voltages of the diodes 9, 10 are low enough, and/or the amplitude of the oscillations applied to their upper terminals high enough, that the oscillations produced at secondary winding 8 of coupling transformer 7, 8 can be transmitted through the anti-parallel-connected diodes 9, 10 to the electroacoustic transducer 11.

With the trailing end of the pulse furnished by pulse generator 5, AND-gate 4 is disabled, thereby terminating emission of the packet of oscillations, FET 12 becomes forward-biased in readiness for signal transmission, and via the upper input of storage stage 16 switching transistor 17 becomes conductive.

When transistor 17 becomes conductive, the initially uncharged timing capacitor 18 commences to charge from battery 1, via variable resistor 20. The rate, or more precisely time time-constant, at which capacitor 18 charges has one or another value, depending upon the setting of variable resistor 20, i.e., dependent upon the setting of focus adjuster ring 21. This provides second means for modifying the measured distance dependent signal in dependence upon the present setting of the objective. Thus there is provided first means operative for deriving from the measured-distance dependent signal a quality of focus signal dependent upon the discrepancy between the present setting of the objective and the setting optically correct for the distance from the camera to the subject. The voltage to which capacitor 18 would charge, i.e., if the charging-up of capacitor 18 were allowed to continue indefinitely, is determined by the ratio of resistances of the variable resistor 20 and fixed resistor 19.

When now the emitted burst of ultrasonic acoutic radiation, reflected from the subject to which it has been aimed, arrives back at electroacoustic transducer 11, the latter converts the radiation into an electrical signal. The forward-bias threshold voltages of the anti-parallel-connected diodes 9, 10 are too high to transmit this received-back signal—i.e., the diodes 9, 10 are selected to assure this—, and instead the received-back signal is transmitted via the main current path of now forward-biased FET 12, amplifier 13 and rectifier stage 14, to the input of pulse shaper 15. The latter issues at its output a well-shaped signal which is applied to the lower input of storage stage 16, thereby rendering switching transistor 17 non-conductive.

Accordingly, the charging-up of timing capacitor 18 now ceases.

At the cease-charging instant, the two RS-master-slave flip-flops 30, 32 are clocked at their clock inputs T, i.e., by the trailing end of the pulse from pulse shaper 15, and these two flip-flops 30, 32 assume (or stay in) states dependent upon the output signals ("0" or "1") of the respective threshold circuits 27, 28. This will be described in greater detail below. Briefly stated, however, if the focus adjuster ring 21 is set for too long a distance, "0" signals are present at the output of both threshold circuits 27, 28 (i.e., the threshold level of neither circuit 27, 28 is exceeded); if the adjuster ring 21 is at a distance-setting acceptably corresponding to the measured subject distance, a "1" signal is present at the output of threshold circuit 27 only (i.e., the threshold level of circuit 27 is exceeded, but not that of circuit 28); and if the adjuster ring 21 is set for too short a distance, "1" signals are present at the outputs of both threshold circuits 27, 28 (i.e., the threshold levels of both circuits 27, 28 are exceeded).

In terms of indicatin to the user, if adjuster ring 21 is set for too short a distance, only LED 35 lights up; if set for too long a distance, only LED 34 lights up; and if set for a distance near enough to the correct distance, neither of LED's 34, 35 lights up.

This will now be explained in greater detail, with respect to FIG. 2.

Figure 2:
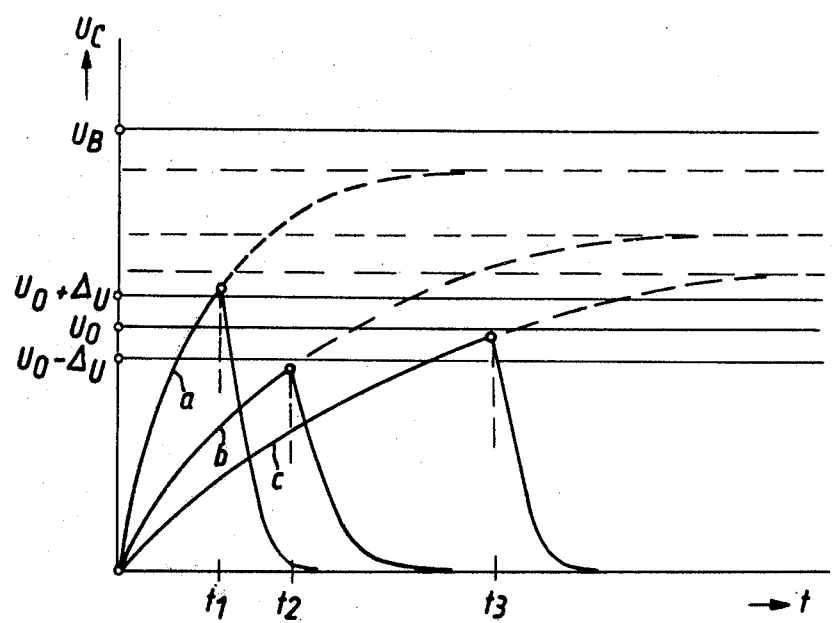
FIG. 2 is a graph referred to in the explanation of the operation of the circuit depicted in FIG. 1.

Exponential curve a in FIG. 2 depicts the charging of timing capacitor 18 when focus adjuster ring 21 is set for a reltively short subject distance. With ring 21 set for a short distance, the resistance value of variable resistor 20 is relatively low, so that timing capacitor 18 charges up relatively fast. Furthermore, with the resistance of 20 low, the resistance of fixed resistor 19 constitutes a relatively high fraction of the combined resistance of 19 and 20, so that the ultimate voltage to which capacitor 18 would charge, i.e., if its charging were not discontinued, is relatively high and quite close to the battery voltage $U_B$ (FIG. 2) itself. This is indicated by the broken-line part of curve a in FIG. 2, which extends past the instant in time when capacitor-charging ceases.

Curve b in FIG. 2 depicts the charging-up of capacitor 18 with focus adjuster ring 21 set for a greater subject distance than was the case with curve a. The resistance of variable resistor 20 is now relatively higher, so that the charging-up proceeds more slowly; likewise, the voltage to which capacitor 18 would ultimately charge (as indicated by the broken-line part of curve b) is now somewhat lower.

Curve c depicts the capacitor charge-up with adjuster ring 21 set for an even greater subject distance. The charge-up rate is still lower, and so also is the voltage to which the capacitor 18 is endeavoring to charge.

Whereas the setting of focus adjuster ring 21 thus determines the charging rate, the voltage actually reached by capacitor 18 at the moment when charging ceases is furthermore determined by the length of time for which the capacitor has been permitted to charge. Because the charging-up of capacitor 18 is terminated when the acoustic radiation emitted towards the subject is received back at th camera, it will be clear that the length of time during which capacitor 18 is permitted to charge is dependent upon the acoustically measured subject distance. Specifically, the longer the true, i.e., acoustically measured, subject distance, the more time capacitor 18 will have to charge; conversely, the shorter the acoustically measured subject distance, the shorter the time capacitor 18 has to charge.

In the illustrated embodiment, the consequence of this is that, if the focus adjuster ring 21 is in fact correctly set, the voltage across capacitor 18 at the instant charging-up ceases will, at least nominally, always be the same, and in particular will, at least nominally, equal the value $U_O$ shown in FIG. 2.

This will be better understood by further consideration of the three curves shown in FIG. 2. The three curves a, b and c in FIG. 2 represent three exemplary situations. In each one, the user has manually set the focus adjuster ring 21 to a setting which is not utterly wrong, i.e., relative to the true subject distance, although in case a the manually selected subject-distance setting is too short by a somewhat more than acceptably small amount, and in case b somewhat too long by a somewhat more than acceptably small amount.

Specifically

In case c, the actual distance to the subject is relatively long. This can be seen from the fact that the instant at which charging of capacitor 18 ceases, namely instant $t_3$, occurs relatively late. The user has manually set the focus adjuster ring 21 to a setting extremely close to a perfect setting. As a result, the voltage $U_C$ across capacitor 18 at the cease-charging instant $t_3$ is, in fact, extremely close to the nominal value $U_O$, and specifically just a very slight amount below $U_O$.

More generally, this value of $U_C$ (just slightly below $U_O$) falls within a factory-selected tolerance range extending from $U_O - \Delta_U$ to $U_O + \Delta_U$, and the system accordingly decides that the error (if any) in the manually selected setting of adjuster ring 21 is of an acceptable amount not justifying further manipulation of adjuster ring 21.

In case a, the true distance to the subject is considerably shorter than in case c, and accordingly the cease-charging instant $t_1$ occurs much earlier, i.e., because the round-trip travel time of the emitted acoustic radiation is shorter. Here, the user has manually set focus adjuster ring 21 to a distance-setting which, although not utterly wrong, is to low (i.e., too short) by an amount justifying further manipulation of adjuster ring 21. In particular, the voltage $U_C$ across capacitor 18 at cease-charging instant $t_1$ is slightly higher than $U_O + \Delta_U$, i.e., is just outside the range of acceptable error. Because the manually selected distance-setting is too short, LED 35 will light up, instructing the user to turn ring 21 to a longer distance setting. The user does this. As the user slowly turns ring 21 to longer distance settings, the acoustic travel time measurement described above is repeatedly performed. When the user has turned ring 21 to an acceptable setting, LED 35 goes dark, and the user need not further manipulate ring 21. In terms of circuit operation, the turning of ring 21 to longer distance settings increases the resistance of resistor 20, reducing the charging speed of capacitor 18, and thereby bringing down the value of $U_C$ at the cease-charging instant to a level within the tolerance range.

In case b, the true distance to the subject is intermediate the situation in cases a and c, and here again the user has manually set focus adjuster ring 21 to a distance setting which is not utterly wrong relative to the true subject distance. However, the manually selected distance-setting is unacceptably high (i.e., too long) and the value of $U_C$ falls just below the lower tolerance limit $U_O - \Delta_U$. Accordingly, LED 34 lights up, instructing the user to turn ring 21 in the direction of shorter subject distances.

From the foregoing, and especially because in the case of perfect focus $U_C$ at the cease-charging instant will nominally have the value $U_O$, it will be clear that the terminal value of $U_C$ (i.e., the value it has at the case-charging instant) constitutes a signal which in itself is indicative of the appropriateness of the present state of focus of the camera relative to the true (i.e., acoustically measured) distance to the subject. In this sense, the terminal value of $U_C$, from this point on merely referred to as $U_C$, can be considered the feedback signal of a negative-feedback system. This will be most clearly grasped by keeping in mind that the purpose of the system is to bring $U_C$ to the value $U_O$, or at least to within the factory-selected tolerance range centered about $U_O$. As such, therefore, $U_O$ constitutes a command or desired-value signal, whereas $U_C$, as already stated, constitutes a feedback or actual-value signal.

Adopting this viewpoint, it is to be noted that $U_C$ is applied to the non-inverting input of an operational-amplifier subtractor 22, whereas the inverting input thereof receives a command or desired-value signal from the junction between the two voltage-divider resistors 23, 24. Resistors 23, 24 are of equal or approximately equal value, in correspondence to the fact that, in the illustrated embodiment, the desired-value signal $U_O$ is equal to about half the battery voltage $U_B$ (FIG. 2).

The voltage produced across the output of operational-amplifier subtractor or comparator 22 is applied across the two potentiometers 25, 26. This voltage in effect constitutes an error signal, because it is dependent on the difference between $U_O$ and $U_C$.

This error signal is applied, via the wiper of potentiometer 26, to the input of threshold circuit 27, as an input voltage $U_1$. $U_1$ exceeds the threshold level of threshold circuit 27 (i.e., producing a "1" signal at the output of 27) if $U_C$ is greater than $U_O - \Delta_U$, namely, if the manually selected distance setting is either within the acceptable tolerance range or too short. Only if the manually selected distance setting is too long, will the threshold level of threshold circuit 27 not be exceeded.

The error signal produced at the output of comparator 22 is furthermore applied, via the wiper of potentiometer 25, to the input of threshold circuit 28, as an input voltage $U_2$. $U_2$ exceeds the threshold level of threshold circuit 28 (i.e., producing a "1" signal at the output of 28) if and only if $U_C$ is greater than $U_O + \Delta_U$, namely if and only if the manually selected distance setting is too short.

The potentiometers 25, 26 are employed to facilitate establishment of the values for $U_O+\Delta_U$ and $U_O-\Delta_U$. For example, threshold circuits 27, 28 may be of identical design and have identical threshold levels, in which case the potentiometers 25, 26 are needed to establish the tolerance range shown in FIG. 2.

If, as elucidated above, the output signal from comparator 22 is considered the error signal of the system, then the two threshold circuits 27, 28, with their associated potentiometers 25, 26, can be considered to be in receipt of the system's error signal per se, with one threshold circuit ascertaining, for positive-polarity error, whether the magnitude of the positive errors is too great, and the other threshold circuit ascertaining, for negative-polarity error, whether the magnitude of the negative error is too great.

However, because threshold circuits 27, 28, with their associated potentiometers 25, 26 are doing this, it will be clear that, if desired, the comparator 22 could be omitted, and instead the voltage across timing capacitor 18 could be applied directly across the two potentiometers 25, 26, with the latter being adjusted to achieve an equivalent end result. In that event, the signal $U_C$ could still be considered the system's error signal, and the two threshold stages 27, 28 would take over the function of the system's comparator, the comparator then being exclusively digital in character.

In the illustrated embodiment, the terminal value $U_C$ of the voltage across capacitor 18 is dependent both upon the true distance to the subject and upon the distance setting to which focus adjuster ring 21 has been set, so that, as already explained, the value of $U_C$ constitutes the system's feedback or actual-value signal. However, a modification would be to replace ring-adjusted resistor 20 with a fixed resistor, so that the voltage across capacitor 18 at the cease-discharging instance instead constitute, every simply, the desired-value signal of the system, being directly indicative of true subject distance, and therefore being indicative of the desired or correct setting into which focus adjuster ring 21 should be brought. In that event, ring-coupled resistor 20 could be used to replace one of the two voltage-divider resistors 23, 24, and the signal furnished by such modified voltage divider would then constitute the feedback or actual-value signal of the system, being indicative as it is of the present setting of adjuster ring 21.

As explained further above, when the received-back signal is generated by transducer 11, switch 17 is rendered non-conductive and timing capacitor 18 ceases charging. Capacitor 18 thereupon commences to discharge through resistor 19 back to zero voltage, as indicated by the decay lines in FIG. 2.

As also already stated, the received-back signal furthermore is applied to the clock inputs T of the flip-flops 30, 32, causing them to assume (and/or stay in) states dependent upon the signals ("0" or "1") at the outputs of threshold stages 27, 28.

Specifically

If the manually selected distance-setting of focus adjuster ring 21 is too low (too short), "1" signals are present at the outputs of both 27 and 28, a "1" signal at the S-input of 30, and a "1" signal at the R-input of 32. Accordingly, a "0" (low signal appears at the Q output of 32, and the voltage drop resulting across LED 35 causes the latter to light up. The "1" (high) signal at the Q output of 30 keeps the voltage drop across LED 34 too low to permit it to light up.

If the manually selected distance-setting of ring 21 is within the factory-selected tolerance range, the Q outputs of both flip-flops 30, 32 register "1" signals, and neither of LED's 34, 35 light up.

If the manually selected distance-setting is too high (too long), the Q output of flip-flop 30 registers a "0" signal and LED 34 lights up, whereas the Q outputs of 32 registers a "1" signal and LED 35 does not light up.

It will be understood that each of the elements described above, or two or more together, may also find a useful application in other types of circuits and constructions differing from the types described above.

While the invention has been illustrated and described as embodied in a merely exemplary focus-control circuit, it is not intended to be limited to the details shown, since various modifications and structural changes may be made without departing in any way from the spirit of the present invention.

Thus, for example, in the illustrated embodiment, the outputs of flip-flops 30, 32 are directly and simply used to control the two indicator diodes 34, 35. Alternatively, however, it would be possible, as is more conventional, to utilize these inventively produced signals to control the energization of a motor operative for automatically changing the setting of focus adjuster ring 21.

Likewise, the timing circuit here employed is of the capacitor-charge type. This is advantageous, because it facilitates modification of the charging speed of the timer in dependence upon the present setting of the focus adjuster ring. However, with reference to the alternative discussed above, i.e., wherein the timing capacitor 18 charges at a rate independent of the adjuster ring setting, the timer could in that case be of the counter-type, i.e., comprising a counter and a pulse generator, the trailing end of the pulse produced by pulse generator 5 initiating counting by such counter, and the received-back signal furnished by transducer 11 stopping the counter, with for example, the leading end of the pulse from pulse generator 5 serving to reset the counter. Also, in the illustrated embodiment, although the timing capacitor 18 is permitted to charge exponentially, not linearly, it will be understood that a linear-charging or integrator-type timing circuit could instead be used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In the focussing system of a photographic camera having an adjustable objective, in combination, means emitting ultrasonic acoustic radiation from the camera towards a subject to be photographed and receiving the reflected-back radiation to produce a received-back signal; timing means connected to be controlled in dependence upon the received-back signal and operative for performing a timing operation whose duration depends upon the time of occurrence of the received-back signal to yield a measured-distance-dependent signal whose value is dependent upon the time required for the emitted acoustic radiation to travel from the camera to the subject and back to the camera; means operative for deriving from the measured-distance-dependent signal a quality-of-focus signal dependent upon the discrepancy between the present setting of the objective and the setting optically correct for the distance from the camera to the subject; signal-processing means receiving the quality-of-focus signal and deriving therefrom digital output signals indicating whether the present setting of the objective is shorter or longer than the objective setting optically correct for the distance from the camera to the subject; and clocked digital storage means receiving said digital output signals and when clocked registering said digital output signals, and including means for clocking the storage means each time acoustic radiation is emitted from and received back at the camera, the timing means comprising a timing capacitor, means for effecting a progressive change of the voltage across the timing capacitor by charging the capacitor, including a first resistor connected in parallel with the capacitor and a second resistor and an electronic switch connected in series with the parallel combination of the first resistor and the capacitor, the second resistor being a variable resistor mechanically coupled to the camera objective and assuming different resistance values in dependence upon the setting of the objective whereby the measured-distance-dependent signal is modified in dependence upon the present setting of the objective, and means for rendering the electronic switch conductive upon emission of acoustic radiation from the camera and for rendering the switch non-conductive in response to the received-back signal.

2. In a focussing system as defined in claim 1, the variable second resistor assuming high resistance values in response to longer objective settings and lower resistance values in response to shorter objective settings, the voltage achieved by the timing capacitor upon termination of the timing operation being substantially the same for all objective settings provided that the present objective setting corresponds to the optically correct setting for the camera to subject distance and thus constituting a quality-of-focus signal, the signal-processing means including a subtractor having a first input connected to receive the quality-of-focus signal, and having a second input and an output, and a voltage divider having a tap connected to the second subtractor input furnishing thereto a desired-quality-of-focus signal having a value at least approximately equal to the value which the capacitor voltage assumes when the objective setting is correct, and first and second threshold circuits each having an input connected to the output of the subtractor and having respective first and second threshold levels such that neither threshold level is exceeded by the signal received from the subtractor output when the subtractor output signal deviates from an acceptable value in a first direction whereas both threshold levels are exceeded when the subtractor output signal deviates from an acceptable value in the opposite second direction.

3. In a focussing system as defined in claim 2, the clocked digital storage means comprising two RS-master-slave flip-flops each having an R and an S input, furthermore including a first inverter having an output connected to one input of the first of the flip-flops and having an input connected to the other input of the first flip-flop and also to the output of the first threshold circuit, and a second inverter having an output connected to one input of the second flip-flop and having an input connected to the other input of the second flip-flop and also to the output of the second threshold circuit.

* * * * *